OBJECT DETECTORS

Original Filed April 13, 1954 2 Sheets-Sheet 1

INVENTOR.
R. S. CHAPIN
BY James B. Grant
ATTORNEY

INVENTOR.
R. S. CHAPIN

BY James B. Grant

ATTORNEY

United States Patent Office

Re. 25,100
Reissued Dec. 19, 1961

25,100
OBJECT DETECTORS

Reynold S. Chapin, Webster, Mass., assignor to Chapin Electronics Corporation, a corporation of Delaware Original No. 2,826,753, dated Mar. 11, 1958, Ser. No. 422,764, Apr. 13, 1954. Application for reissue Mar. 10, 1960, Ser. No. 14,161
31 Claims. (Cl. 340—258)

Matter enclosed in heavy brackets [ ] appears in the original patent but forms no part of this reissue specification; matter printed in italics indicates the additions made by reissue.

My invention relates to moving object detector systems generally and more particularly to personnel intrusion devices, anti-collision devices, and traffic control devices wherein continuous wave radio frequency or acoustic energy radiated from and received by a single antenna or transducer may be used for the purpose of determining the presence of moving objects, and the velocity, range, and direction of motion of an object. The objects to the motion of which I refer are in general any objects capable of absorbing or reflecting radiant waves of radio or acoustic energy such as people, animals, vehicles, trains, ships, boats and airplanes.

Typical prior art forms of moving object detectors, as described in U.S. Patents No. 2,197,028, No. 2,224,246, No. 2,655,645 and No. 2,400,309, have employed both acoustic and radio frequency radiators of energy wherein a stationary standing wave pattern of energy was established within an enclosure. Such systems in the acoustic art frequently use a device known as a transducer which converts electrical energy to acoustic energy and vice versa. Examples are the loudspeaker and microphone. Usually separate transmitting and receiving transducers were employed. The receiving transducer or antenna was connected to a receiver which was then adjusted to the particular level of the standing wave energy existing at the receiving transducer or antenna. Upon entrance of a moving object into the pattern of the standing wave energy, the pattern was disturbed and the delicate balance between the energy at the receiving transducer or antenna and the receiver sensitivity was upset. By means of suitable amplifiers and relays connected to the receiver, a relay was caused to operate and in turn to energize alarm. signalling or process control devices. Other prior art forms of moving object detectors have utilized a single transducer or antenna alternately switched on a time basis between the transmitter and the receiver. Thus while the transmitter was radiating energy, usually in pulse form, the receiver was de-energized and therefore insensitive to reflections of energy from short range, nearby objects.

In general, prior art systems for the detection of moving objects have been complex systems necessitating interconnection of a multiplicity of units, and requiring stationary or fixed installation of units in order to obtain stability of performance; interdependent adjustment of the various units of the system was necessary in order to obtain sufficient sensitivity. Frequently, the very adjustments which result in high sensitivity also coincide with the operating parameters giving rise to instability and consequent false alarms.

My invention contemplates the design of a completely dynamic moving object detector system responsive only to the relative motion of objects and free from the numerous causes of instability which have characterized previous systems. My invention consists of a self-contained power supply, oscillation generator, radiator, detector, amplifier, control relay and alarm or signalling device, packaged in a single unit and having the following attributes: light weight, smallness, low cost, simplicity of design, portability, adaptability to a new environment without necessity for readjustments of the circuits, continuous single dial adjustment of the range of sensitivity from maximum distance down to zero distance; continuous uninterrupted sensitivity in a path or paths from the unit to moving objects out to the maximum range of sensitivity of the invention; continuous sensitivity on a time basis to the motion of objects; interdependence of location whether within an interior or not; freedom from the necessity of making tuning or balancing adjustments either to obtain maximum sensitivity or to accommodate various environment conditions; freedom from the unstabilizing effects of frequency drift, component and tube drift and aging; freedom to readily and easily select the pattern of the energy radiations so that either omnidirectional sensitivity or directional sensitivity to moving objects may be obtained; availability of signals, voltages, and currents for the measurement of the speed, distance or range of an object, direction of motion of an object and the number of objects which may appear in the sensitive field of the invention; elimination of a multiplicity of numerous units which must be interconnected and mutually adjusted for optimum performance, elimination of a multiplicity of transmitting and receiving transducers or antennas which must be resonated to the frequency of operation and substitution therefor of a single transducer or antenna which need not be critically adjusted to the frequency of operation. The single transducer or antenna, due to the novel design of the system, simultaneously and continuously performs the dual functions of radiating energy to and receiving energy from a moving object without interference of one function with the other.

It is well known to those versed in the art that any objects which move in a standing wave pattern of either radiated acoustic or radiated radio frequency energy will cause changes in the field pattern due to the absorptive and reflective qualities of the objects. Since a moving object will reflect incident energy (transmitted signals) and disperse it in many directions, it will reflect some of the incident energy back to the transmitting or radiating device. The returned energy will be of the same frequency as the transmitted and radiated energy but it will be delayed in phase or time depending upon the relative movement of the object, the distance between the transmitter and the object, and the propagation characteristics of the medium into which the energy is being radiated. As the energy reflected from an object is returned to the original radiator, it will create a voltage across the impedance of the radiator and a current will flow.

My invention makes use of a single stage oscillation generator, although a generator followed by an amplifier may be used. The oscillation generator is unmodulated by either pulses or any other form of modulation. It is a continuous wave oscillation generator developing a single frequency. It is coupled to the radiating device which may be either an acoustic transducer or a radio frequency antenna, depending upon the mode of operation. Since the oscillation generator supplies voltage and current to the radiator continuously, the returned energy from the object will combine in the radiator impedance with the oscillation energy being continuously supplied to the radiator, and a new voltage-current ratio or impedance will result. The voltage developed as a result of reflection from the object will be small in comparison with the voltage developed across the radiator impedance with the oscillation generator; however, the voltage developed as a result of reflection will be out of phase with voltage developed across the impedance by the oscillation generator, and when the two voltages combine, a vector sum of the two voltages will result. If any object of the types described is moving in the radiation area and reflecting energy back to the radiator there will be a change or fluctuation in the impedance of the radiator and in the resultant vector voltage. I have found that motion of an object in a radio-frequency field will not only cause a varying amplitude of energy to be returned to the radiator, but that very significant changes in the phase relationship between the generated and the reflected voltage will result, with correspondingly large changes in the resultant vector voltage for relatively small motion of the object. If the wave-length of the radiated radio-frequency energy is chosen so that equipotential points in the standing wave pattern are separated by a distance comparable to, or smaller than, the physical size of the moving object, then very slight motion of the object will result in a large phase change of the resultant vector voltage at the radiator impedance with a correspondingly large change in the impedance of the radiator.

When there is no motion of an object in the standing wave field, the vector voltage resulting from the combination of the generated voltage and the reflection from stationary objects in the field pattern is stable and constant. However, when motion occurs the resultant vector voltage and the impedance of the antenna or transducer change. If the moving object progresses at a constant rate through the field of energy, the instantaneous vector voltage appearing across the radiator impedance will fluctuate up and down in amplitude in accordance with the speed of the object. The rate of this fluctuation is constant if the object moves at a constant speed and is in the order of one cycle per second (or one 360° rotation per second of the return signal vector with reference to the generator output vector) for a person walking at a normal speed in a standing wave field of ultra high frequency radio energy. By knowing the wavelength of the constant frequency transmitted signal, direct measurement of the frequency of fluctuation of the returned voltage or the rotation of the resultant vector will yield information as to the speed of the object. The frequency of the fluctuations may be converted into speed by means of suitable conversion and calibration factors.

Since the returned signal from the moving object is attenuated in space by a factor proportional to the distance between the moving object and the radiator, the average amplitude of the vector resultant voltage, averaged over several successive fluctuations, will be a measure of the relative distances of the object from the radiator. Additionally the change in peak amplitude between two or more successive fluctuations of the vector voltage will also be a measure of the distance or range of the object from the radiator. This difference in amplitude between successive fluctuations may be measured and by means of suitable conversion and calibration factors the distance or range to the moving object may be obtained.

Since my invention contemplates the use of either acoustic radiators or the use of antennas operating in the ultra high frequency radio range, it should be recognized that the pattern of energy transmission can be changed easily from directional to omnidirectional through the simple expedient of substituting a directional or omnidirectional acoustic transducer or antenna of the type well known in the art. Therefore the radiated energy may be directed into any given area and be excluded from all other adjacent areas. Movement of an object within the energized area will cause a change in the resultant vector voltage and impedance of the radiator. By means of suitable azimuth and elevation indicators coupled to a revolving radiator, the exact vertical and horizontal direction in which an object is moving relative to the radiator may be ascertained.

Any change in impedance or voltage-current ratio occurring at the transmitter radiator may be suitably detected or rectified, and the resulting signal employed to operate conventional electrical, electromechanical or electrochemical devices for the purpose of indicating, signaling, or initiating other processes. Any impedance change in the radiator may be reflected to the generator or generator amplifier circuits and cause other manifestations representative of the presence of a moving object within the standing wave field. If a self-excited generator is employed to generate the continuous wave energy, and it is coupled to the radiator, a change of impedance of the radiator may be made to cause a change of the impedance of the frequency controlling elements of the generator. Therefore, a moving object in a standing wave field, reflecting energy back to the transmitting radiator, will cause a change in the impedance of the radiator, and by reason of the coupling between the radiator and the frequency controlling elements, a corresponding change in the impedance of the frequency controlling elements results which in turn leads to a change in the operating frequency phase or of the generator signal voltage. By means of suitable frequency or phase measuring equipment, coupled to the generator, the change in frequency or phase of the generator may be determined and thus the presence of a moving object in the field pattern detected. The rate of frequency or phase change, will be a measure of the speed of the object, and the magnitude of the frequency or phase change will be a measure of the distance of the moving object from the transmitting radiator.

Any change in the impedance of a radiator coupled to a generator or amplifier of generated energy will result in a corresponding change in the impedance of the generator or amplifier itself which will cause the generator or amplifier to draw more or less power from the source supplying it. Thus any impedance change of the coupled radiator will result in a change in the potentials and currents appearing in the circuitry of the generator or amplifier. Any of these changes may be utilized to indicate the presence of a moving object in the energy field, to measure the speed of the object, and to determine the distance of the object from the radiator.

The single requirement for the development of a fluctuating vector voltage at the radiator impedance is that there be motion of an object with respect to the radiator. Therefore, due to the novel features of my invention it is practical to mount the moving object detector upon a moving carrier, such as a boat or vehicle, for the purpose of an anti-collision detector operating whenever the carrier approaches a stationary object or another object having motion relative to the speed of the carrier. Additionally, since the radiated pattern of energy can readily be made directional or omnidirectional in nature by means of plugging in the proper transducer or antenna, the moving object detector can be used as a navigational aid for the purpose of determining the presence of objects, determining the relative speed of objects and determining the location of objects relative to the position and speed of the carrier upon which the moving object detector is mounted.

Since one embodiment of my invention operates in the ultra-high-frequency portion of the radio frequency spectrum, non-metallic physical barriers, such as stored materials, partitions, walls, floors, and ceilings, are penetrated by the radio frequency energy. Thus one of the novel features of my invention is to detect the motion of objects when they are separated from the moving object detector by such non-metallic physical barriers. Conversely, the radio frequency energy may be confined to a given area and prevented from reaching another adjacent area through the expedient of providing metallic shields, such as metallic paint on a supporting surface as a wall, or by erecting wire screens at the point one wishes to stop the energy.

One embodiment of my invention, employing a single acoustic transducer for the radiation of an acoustic standing wave pattern and for the simultaneous reception of reflections from objects, is extremely sensitive to impedance changes in the propagation medium, namely air.

Therefore, upon any rapid change in the acoustic impedance of the air, as results when fire occurs, there will be a corresponding change in the resultant vector voltage appearing across the impedance of the radiator, the acoustic transducer. This acoustic embodiment of my invention may be used as a fire detector and fire alarm system as well as providing simultaneous moving object detection. Another feature of the acoustic embodiment of my invention is to provide a radiated pattern of acoustic energy, which because of its nature is readily confined to an enclosure due to the high impedance to passage of acoustic energy offered by physical barriers, such as partitions, walls, floors, stored materials, and ceilings.

One of the objects of my invention is to provide an improved system and apparatus for the detection of motion of objects relative to the system and apparatus by means of a radiant field of energy.

Another object of my invention is to employ only a single radiating means such as a transducer to radiate acoustic energy or an antenna to radiate radio frequency energy, said radiating means to simultaneously radiate energy to a moving object and receive reflected energy from the moving object. Another object of my invention is to employ only a single radiating means where the radiated signal and the received signal which is reflected from stationary objects in the field of energy combine in the impedance of the radiator without interfering with each other and without decreasing the sensitivity of the system or apparatus to the detection of motion.

Another object of my invention is to detect the motion or absence of motion of objects, when there are nearby objects which are stationary relative to the object in motion, or other objects which may be in motion but at a different relative speed than the object whose motion is to be detected.

Another object of my invention is to provide an improved system and apparatus for the detection of motion of objects within an interior without requirement for making any adjustments in the invention or apparatus to compensate for the presence of an enclosure.

Another object of my invention is to provide an improved system and apparatus for the detection of motion of objects outside of any enclosure without the necessity of making any adjustments in the system or apparatus to compensate for the absence of an enclosure.

Another object of my invention is to provide an improved system and apparatus for the detection of motion of objects when they are separated from the system and apparatus by non-metallic partitions, walls, floors, ceilings, and stored materials.

Another object of my invention is to provide an improved system and apparatus for the ready interchange of the mode of operation from an acoustic or ultrasonic type of radiated energy field to a radio frequency radiated field by means of interchangeable generators and radiating devices without the necessity of making any other changes in the system.

Another object of my invention is to provide an improved system and apparatus for the detection, measurement and location of the object which has motion relative to the system and apparatus by means of a radiated radio frequency field.

Another object of my invention is to provide an improved system and apparatus for the detection, measurement and location of an object which has motion relative to the system and apparatus by means of a radiated acoustice or ultrasonic field.

Another object of my invention is to provide an improved system and apparatus for the detection measurement and location of an object having motion relative to the system and apparatus which is free from the false indications caused by changes of temperature, humidity, voltage and frequency drifts characteristic of prior art equipment.

Another object of my invention is to provide an improved system and apparatus for the detection, measurement, and location of an object which has motion relative to the system and apparatus without the necessity of installation of a multiplicity of interconnected units comprising the system, my invention being composed of a single self-contained unit including alarm, indicating and measuring devices.

Another object of my invention is to provide an improved system and apparatus for the detection, measurement and location of objects having motion relative to the system and apparatus without the necessity for adjustment of balancing or cancellation circuits or devices to compensate or cancel out the direct radiation from the transmitting device to the receiving device in order to improve the detection sensitivity to a moving object.

Another object of my invention is to provide an improved system and apparatus for the detection of objects having motion relative to the system and apparatus by a novel dynamic method which does not require that any reference condition of balance or stability be established prior to the detection of object motion.

Another object of my invention is to provide an improved system and apparatus for the detection of motion or detection of the absence of motion of an object without the necessity of making any adjustment to compensate for the presence of stationary objects or absence of stationary objects in the field of the radiated energy.

Another object of my invention is to provide an improved system and apparatus for the confining of the radiated energy to an enclosure so that detection, measurement and location of objects moving within the enclosure is accomplished without reaction to the motion of objects outside of the enclosure.

Another object of my invention is to provide an improved system and apparatus for the counting of the number of moving objects passing through the radiated field.

Another object of my invention is to provide an improved system and apparatus for the measurement of speed of moving objects in the radiated field.

Another object of my invention is to provide an improved system and apparatus for the measurement of the relative speed of the object with respect to the system and apparatus.

A still further object of my invention is to provide an improved system and apparatus for the detection and measurement of the direction in which an object is moving.

A still further object of my invention is to provide an improved system and apparatus for the detection, indication and measurement of relative motion of an object without the necessity for setting up or creating a stationary standing wave pattern.

Another object of my invention is to provide an improved system and apparatus for the detection, indication, and measurement of the presence of a moving object at a predetermined finite range to the exclusion of detection, indication, or measurement of moving objects at other distances or ranges.

A still further object of my invention is to provide an improved system and apparatus for the detection, indication and measurement of objects having motion relative to the system and apparatus whereby the radiator, such as an acoustic transducer or radio frequency antenna, may be readily changed from an omni-directional type to a directional type and so control the pattern of the radiated energy to provide discrimination or absence of it to objects in a predetermined area.

A still further object of my invention is to provide an improved system and apparatus for the detection, indication and measurement of an object, which has motion relative to the system and apparatus, by means of detecting the resultant vector current amplitude arising in the antenna or transducer impedance through combination of the generated signal currents and the received signal currents resulting from reflections of energy from objects in the radiated field pattern.

A still further object of my invention is to provide an improved system and apparatus for the detection, indication, and measurement of the motion of objects relative to the system and apparatus by detection of the change in the frequency of the oscillation generator resulting from the signal current developed in the antenna or transducer impedance due to reflection of energy from the objects in the radiated field pattern.

Another object of my invention is to provide an improved system and apparatus for the detection, indication and measurement of objects having motion relative to the system and apparatus by means of detecting the change in the currents and voltages appearing in the circuitry of the oscillation generator as a result of the signal current developed in the antenna or transducer impedance by means of reflections of radiated energy from the object or objects.

Another object of my invention is to provide an improved system and apparatus for the detection, indication and measurement of objects having motion relative to the system or apparatus when the moving object detector is mounted on a moving carrier such as a vehicle or ship thus providing an anti-collision warning device and a navigational aid.

A still further object of my invention is to provide an improved system and apparatus for the detection, indication and measurement of an object having motion relative to the system and apparatus when such moving object detector is located in a region subject to acoustic noise, electrical oscillatory discharges, vibration, and rapid circulation of air.

Another object of my invention is to provide an improved system and apparatus for rapidly and inexpensively determining the radiated field pattern contours of a radiating device such as an acoustic transducer or radio frequency antenna.

Referring now to the drawings.

Figure 1:
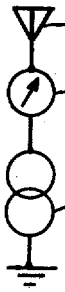
FIGURE 1 is a schematic diagram of the invention in an elementary form employing an electro-magnetic radiation technique.

With reference to FIGURE 1, a continuous wave radio frequency oscillation generator 1, supplies power to a radiating antenna 3. Average radio frequency current in the antenna is indicated by current meter 2. Reflections of energy from nearby objects in the field of the standing wave pattern of radiated energy reflect some of this energy back to the antenna 3. If a reflecting object is moving, the energy returned to the antenna will be of variable amplitude and of variable phase with respect to the energy being transmitted. As the returned energy from an object impinges upon the antenna, currents are caused to flow in the antenna impedance will combine with the steady current supplied to the antenna impedance from the oscillation generator. Although the returned signal currents are small in amplitude in comparison with the current supplied by the oscillation generator, there will be a change in the average antenna current as indicated by meter 2 resulting from motion of reflecting objects. The larger current from the oscillation generator masks the smaller received signal current. The change in antenna current indicated by the meter 2 will be so small, however, that it will be almost imperceptible except with the most sensitive measuring apparatus and dependent on the proximity of the detected object.

Figure 2:
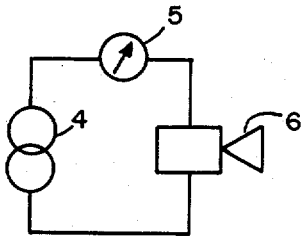
FIGURE 2 is a schematic diagram of the invention employing an acoustic radiation technique.

This same theory of operation applies equally well to FIGURE 2 which operates upon the principle of radiating acoustic energy rather than radio frequency.

In FIGURE 2, oscillation generator 4 is an audio or ultrasonic generator supplying power to an acoustic transducer 6 which may be a loudspeaker of the tweeter type or a magnetostriction device which converts electrical, audio or ultrasonic energy into sound waves and propagates these waves into the air. Indicating meter 5 measures the amount of average current supplied to the transducer 6.

Figure 3:
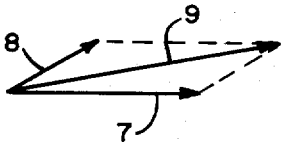
FIGURE 3 is a vector diagram showing the relationship of the voltages or currents appearing in the radiator representing the transmitted signal, the reflected signal, and the resultant vector summation of the two.

FIGURE 3 shows the current or voltage relationships existing in the antenna or transducer impedance for the generated and the received signal currents or voltages. The steady current or voltage supplied by either generator 1 or 4 is indicated by vector 7. The received signal current or voltage resulting from reflected energy is shown as vector 8. Vectors 7 and 8 combine in the antenna or transducer impedance vectorially to form resultant current or voltage 9. When the reflecting object is stationary, vector 8 is of constant amplitude and of fixed phase relationship with respect to generated signal vector 7. However when a reflecting object is in motion, vector 8 revolves rapidly in phase and changes greatly in amplitude depending on the distance of the object from the antenna or transducer. Thus the resultant vector 9 will also vary greatly in both amplitude and phase when an object is in motion. Vector 9 will change from a maximum value equal to vector 7 plus vector 8 to a minimum value of vector 7 minus vector 8. Rotation rate of vector 8 is proportional to the speed of the moving object.

Figure 4:
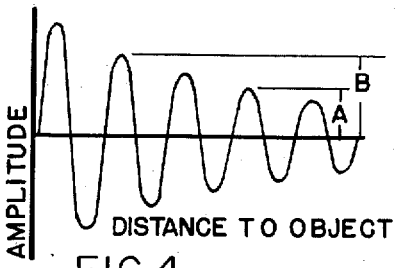
FIGURE 4 is a graph showing the wave form of the voltage or current representing the reflected signal of FIGURE 3.

FIGURE 4 illustrates the behavior of vector 8 whose amplitude is plotted as a function of the distance of the moving object from the antenna. As the moving object approaches the antenna from an infinite distance in a free field pattern, the amplitude of vector 8 gradually increases from zero, oscillating from a positive amplitude to a negative amplitude in a continuous fashion. If the object moves at a constant rate, the returned signal oscillations are periodic in frequency and are a measure of the speed of the object. Should the object stop at any point, vector 8 will have a fixed amplitude and phase with respect to vector 7, the generated current, depending on the position of the object in the standing wave field. The average amplitude of the returned signal oscillations is inversely proportional to the square of the distance between the object and the antenna. Thus the returned signal amplitude at A indicates that a given object is a further distance from the antenna as compared with the average amplitude at B indicating that the object is closer to the antenna. If the vector 8 or the resultant vector 9 were plotted on a moving chart recorder for motion of a given object, the exact distance of an object may be measured. Ambiguity as to whether the object was approaching or receding from a particular amplitude value and corresponding physical position may be resolved by noting the direction of rotation of vector 8 or 9. It is evident that for a short travel of the moving object, the phase change of vector 8 with respect to the vector 9, is appreciable giving rise to an extremely sensitive method for the detection of moving objects.

My invention employs the principle of isolating and utilizing the action of either vector 8, the returned signal current or voltage, or the change in the resultant current or voltage vector 9, in order to detect the motion of the aforementioned types of objects. It will be apparent that through the use of this principle of motion detection that many new and novel features result, permitting applications heretofor considered uneconomical or impracticable. Prior systems have operated on the Doppler principle wherein the moving object caused a measurable change in the frequency of the received energy. Other systems employ a pulse type arrangement wherein the energy is transmitted intermittently and the transmitter and receiver are alternately connected and disconnected from the antenna. By sharing of the single antenna between the transmitter and the receiver on a time basis, the masking of the weak received signal by the stronger transmitted signal was reduced and fair system sensitivity with longer range detection was achieved. This time sharing process in effect resulted in the elimination of vector 7, FIGURE 3, so that only vector 8 remained to be detected by the receiver. For short range detection of moving objects, the pulse type system has many drawbacks such as equipment complexity, stray currents, and inherent limitation of the minimum range because of the finite duration of the transmitted pulse and the consequent insensitivity of the receiver during the pulse. The undesirable loss of receiver sensitivity due to the masking effect of the generated current in the antenna or transducer impedance, when using a single antenna or transducer for the simultaneous transmission and reception of reflected signal currents is eliminated in my system without the expense and complexity involved with pulse or modulating systems.

Figure 5:
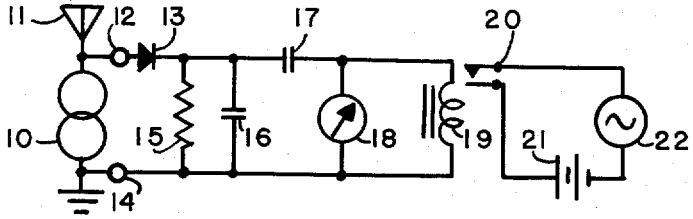
FIGURE 5 is a comprehensive circuit diagram of a radio frequency signal generator, antenna, detection circuit, and alarm or measuring system.

FIGURE 5 represents an embodiment of my invention wherein continuous wave oscillation generator 10 of the type commonly employed to generate continuous waves of the order of one meter or less in wavelength supplies current to radiating antenna 11 which may be of any of the commonly known types of directional or omnidirectional antennas applicable to this wavelength range. By suitable proportioning of the relative impedances of the generator and the antenna, sufficient resultant vector current will be formed by the combination of the generator or current and the reflected signal current, when a moving object enters the radiation field, to create a resultant vector voltage across terminals 12 and 14.

The resultant vector voltage 9 is impressed on the rectifier-detector 13 and the rectifier-detector load impedance comprised of resistor 15 and capacitor 16. The steady generated current represented by vector 7, in the absence of reflections from a moving object, will be rectified and appear as a constant D.C. current in the resistor 15. Capacitor 16 is therefore charged to a steady D.C. potential which served to bias the rectifier-detector to an operating point efficient for the passage through the rectifier of small fluctuations in the steady generated current. When an object reflects energy to the antenna during motion, vector 8 revolves and appears as a modulation superimposed upon the steady generated current, vector 7.

Let us assume that a person is walking towards or away from the apparatus at a normal rate through the standing wave pattern. If the generator is transmitting at a frequency of approximately one meter in wavelength, the frequency of rotation of vector 8 and the frequency of amplitude change the resultant vector 9 is approximately one cycle per second. This one cycle per second modulation on the steady carrier is passed by the rectifier-detector where it appears as a modulation upon the previously described steady D.C. voltage appearing across capacitor 16. Coupling capacitor 17 will pass only an alternating current or a fluctuating D.C. current. Hence the steady D.C. component of the voltage appearing across capacitor 16 resulting from the generated current, vector 7, will not be passed on to indicating meter 18 but the changes in the D.C. voltage resulting from the returned signal energy reflected from a moving object, that is, the amplitude changes in vector 9, will be passed through capacitor 17 to the indicating meter 18. If the moving object is a person walking at a normal rate in the standing wave pattern as described, the pointer of the meter 18, will oscillate at a rate of approximately one cycle per second. For purposes of illustration of this principle, it is advantageous to consider a center zero meter. The pointer of such a meter will fluctuate up and down scale about the zero mark as a moving object proceeds through the U.H.F. standing wave field. This same indication occurs with an object which absorbs energy as it progresses through the standing wave field. Obviously similar indications occur whether an object advances or recedes from the antenna. Since the fluctuating voltage appears across the terminals of meter 18, it will also appear across the terminals of relay coil 19. When sufficient current flows in the coil, relay contacts 20 will close causing indicator 22 to operate by virtue of the current supplied by power source 21. Indicator 22 may be a bell, lamp, horn, timing device, printing device, recording device, or other process control device. Additional relay contacts may be arranged to produce a lockin result whereby the contacts will remain closed after an initial impulse of energy has closed the contacts. Thus the indicator will be continuously energized by power source 21 until the relay coil circuit is opened by means of an added switch 23 which may be manually operated or operated by means of some connection with the indicating device 22.

The degree of deflection of the pointer meter 18 is a measure of the distance of the object from antenna 11; the closer the object, the greater the deflection. The rate of movement of the pointer, or the frequency of oscillation of the pointer, is a measure of the relative speed of the object.

By converting the steady generated alternating current, vector 7, to direct current by means of rectifier-detector 13, and preventing this D.C. current from flowing to meter 18 by means of capacitor 17, the masking effect of the generated current 17 on the small received current, vector 8 is eliminated. Alternately instead of using capacitor 17, the meter may be connected in series with a bias battery of opposite polarity to the D.C. voltage developed across resistor 15, suitably adjusted so that in the absence of a moving object the meter pointer will indicate zero. Thus the steady component of current due to the generated signal is cancelled out. By elimination of the steady current component due to the generated current a very high degree of sensitivity to moving objects is obtained.

Figure 6:
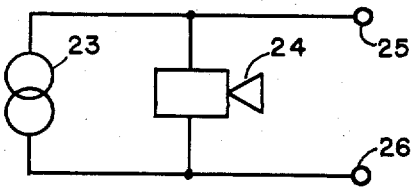
FIGURE 6 is an interchangeable acoustical transducer and signal generator for use in the system of FIGURE 5.

Conversion of the radio frequency system to an acoustic system may readily be done by disconnecting generator 10 and antenna 11 from terminals 12 and 14 and substituting the circuit of FIGURE 6. This circuit consists of a continuous wave audio or ultrasonic generator 23 and an acoustic transducer 24. It is connected by means of terminals 25 and 26 to terminals 12 and 14. The operation of the rectifier-detector and the other portion of the circuit remain the same as in the radio frequency system. Provided the interchangeable units are properly designed, no further adjustments or changes need to be made in converting from a radio frequency system to an acoustic system or conversely.

Figure 7:
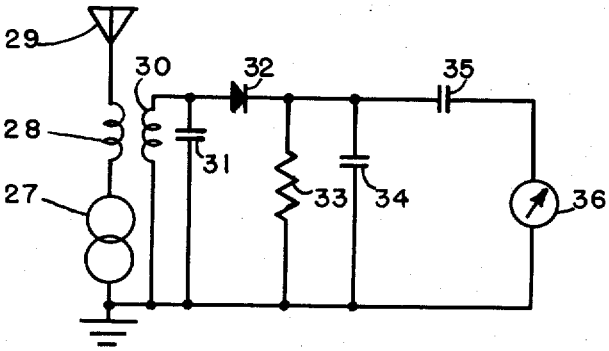
FIGURE 7 is another embodiment of the invention showing an arrangement adapted for operation on the basis of frequency change.

FIGURE 7 shows another arrangement of the invention. A continuous wave oscillation generator 27 is connected to antenna 29 by means of coupling coil 28 which by mutual induction couples some of the antenna energy to the coil 30. Both the continuous wave generated energy and the returned energy from reflecting objects are transmitted to coil 30. Coil 30 is resonated to the generator frequency by means of capacitor 31 under the condition of absence of moving objects. When motion of an object occurs and energy is absorbed or reflected from or to the antenna, the resultant current, represented by vector 9, flowing in the antenna impedance will change and therefore the antenna loading will change. The generator frequency may be made to change in accordance with the antenna loading change dependent upon the stability of the generator. Since coil 30 in combination with capacitance 31 is resonated to the original frequency of the generator before loading by a moving object, the total current in the resonant combination will change, thus giving rise to a change in the current in rectifier-detector 32 and in the current in load resistor 33 and capacitor 34. This action differs radically from that occurring in capacity operated relay system in that in my invention motion of an object anywhere in the standing wave field can produce a frequency change. In the capacity-operated relay system the motion of the object must be in proximity to the antenna. In the capacity-operated relay system a moving object approaching the antenna (in close proximity) causes a unidirectional frequency change in the oscillation frequency; however in the present invention such a moving object will cause bidirectional frequency changes comparable to the amplitude changes indicated in FIGURE 4. The changing amplitude of the current in the resistor 33 due to motion of an object creates a voltage across the resistor which is passed through coupling capacitor 35 to the indicating meter 36. Meter 36 will then indicate presence or absence of motion, distance of the object, and the speed of the object as in the case of FIGURE 5. Likewise, oscillation generator 27, coupling coil 28, antenna 29, coil 30 and capacitance 31 may be replaced by their acoustic counterparts and the system converted to an acoustic system with the same general performance characteristics.

Figure 8:
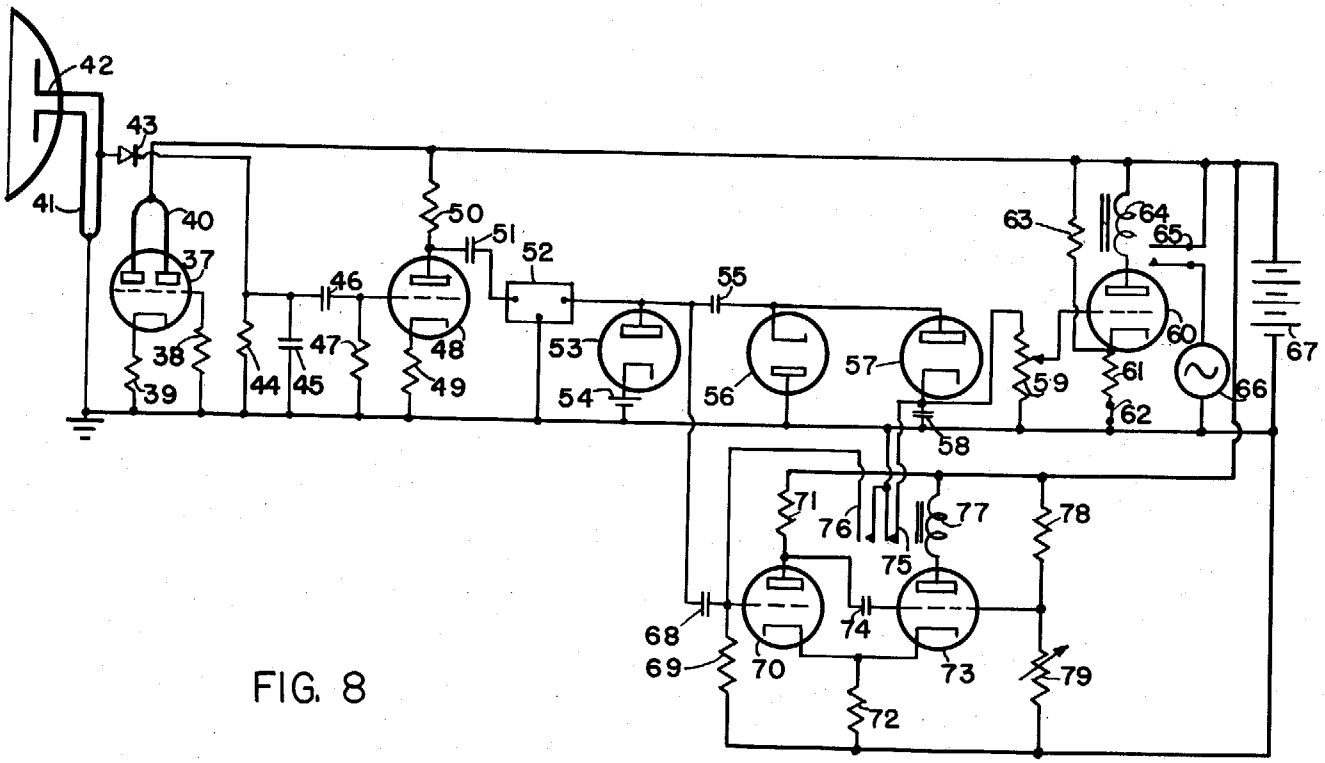
FIGURE 8 is a detailed circuit diagram of one form of the invention.

FIGURE 8 is another embodiment of my invention wherein 37 is a self-excited single envelope continuous wave oscillation generator of the type commonly used at the wavelengths of one meter or less. Resistor 38 is the grid return resistor and resistor 39 provides cathode bias. Resonant line 40 determines the frequency of the oscillations and also couples energy to antenna pick-up loop 41 which feeds energy to antenna 42. The antenna may be either directional or omnidirectional. In this embodiment, there are no circuits which need be resonated to the frequency of the oscillation generator, therefore frequency stability of the oscillation generator is unimportant as it may drift within its normal tolerances without appreciably changing the amount of energy radiated from the antenna 42. When no reflected signal is being received, the current resulting from vector 7 of FIGURE 3 passes from the antenna coupling 41 through rectifier detector 43 to detector load resistor 44. Capacitor 45 charges up to the average voltage appearing across resistor 44. Capacitor 46 blocks the steady generated voltage from the grid of tube 48. When a reflected signal appears at antenna 42, the resultant combination of the generated current and the received current, vector 9, is rectified by rectifier-detector 43 and is passed on to the load resistor 44 and the capacitor 45 as before. However the signal resulting from object motion is then passed through coupling capacitor 46 to amplifier tube 48 for which grid resistor 47, cathode bias resistor 49, and plate resistor 50 serve to provide suitable operating impedances. After amplification, the signal is passed through coupling capacitor 51 and electrical filter 52 which passes signals of the desired frequency range.

Filter 52 may be a high-pass, low-pass or band-pass filter of conventional design the frequency response characteristics of which depend upon the type of object the motion of which is to be detected.

Since the type of moving object to be detected in a given application is usually predictable, its speed or anticipated range of speed is also predictable. For example the range of speed of a person is relatively small as compared with the possible range of speed of a vehicle or train. Upon conversion of the motion of an object into electrical impulses or signals, and by means of suitable electrical filters, the moving object detector may be made sensitive to the characteristic motion of one type of object only, rejecting signals from other objects having different characteristic motion. Thus by making electrical filter 52 a low frequency band-pass filter having its center frequency of response at a few cycles per second and only a few cycles wide in the pass-band, one may detect the motion of people and not the motion of higher speed objects even though they are in motion in the field of radiated energy. Since my invention is a dynamic system, it is responsive only to objects which are in motion relative to the apparatus, and which create signals of suitable frequency range to pass through the electrical filter and eventually activate alarm or indicating circuits. The filter may be any conventional design of low-pass, high-pass or band-pass depending on the frequency range desired.

Following electrical filter 52, the moving object signal is limited in amplitude by diode rectifier 53 which is biased to a positive cutoff level by battery 54. This limited positive polarity signal is then fed to a conventional impulse counter circuit the output of which triggers a relay control tube 60. The purpose of the counter circuit is to establish positively that a moving object is creating the signal and not some other cause such as transient impulses of energy received by the antenna or transducer. A true moving object will create a finite number of signal oscillations in a given interval of time whereas a transient spurious impulse will not. Therefore by counting the number of impulses in a given time and determining that sufficient signal impulses are present before tripping the alarm or indicator relay 64, the moving object detector is made independent of spurious signals. The counter circuit operates simultaneously and interdependently with a synchronized timing circuit. For each positive impulse of moving object signal applied to capacitance 55 from limiter 53, capacitances 55 and 58 charge up through diode rectifier 57 so that the sum of the potentials across capacitances 55 and 58 equal the potential of power supplied by battery 67. The charge received by capacitor 55 is removed on the negative peak of the succeeding signal from electrical filter 52 by discharge through rectifier 56 but discharge of capacitance 58 is prevented by rectifier diode 56. By making capacitance 58 much larger than capacitance 55, the output voltage of the counter appearing across capacitance 58, will be a step function of voltage in which each increment of voltage resulting from each applied positive signal to the counter is added to the previous increment of voltage. Thus for a given number of positive input signals there will be an equal number of step voltage increments output.

In order to time the number of voltage increments occurring a single-shot multivibrator, tubes 70 and 73, controls relay contacts 75 and 76 which start and stop the timing interval upon the application of a single positive input signal which is applied simultaneously to the counter circuit and the single-shot multivibrator.

By means of coupling capacitance 68 connected to the output of the diode rectifier 53, the positive polarity portion of the moving object signal causes conduction in tube 70 which is normally biased to cutoff by virtue of the high current in the common cathode resistor 72 resulting from the positive bias applied to the grid of tube 73 through resistors 78 and 79. As a result of conduction in tube 70, a negative pulse is applied to tube 73 which cuts it off and stops current flow in relay coil 77. Normally open contacts 76 close and prevent any further signal from reaching the grid of tube 70 while normally closed contacts 75 open and permit the charging of counter capacitor 58. Thus during the interval after the first application of a positive input signal to the counter, a moving object will develop a sufficient number of step increments of voltage across capacitor 58 to cause conduction of tube 60 and the closure of relay contacts 65 thereby actuating the alarm or other indicator 66 from energy supplied by the power supply, battery 67. If a transient impulse initiates the action of the counter and the single-shot multivibrator, the relay contacts 65 will not close because an insufficient number of step voltage increments will be built up during the predetermined timing interval across the capacitor 58 to cause conduction of tube 60. At the end of the timing period, determined by the discharge of coupling capacitor 74 through resistors 71, 78, and 79, tube 73 becomes conducting and the current through relay coil 77 closes contact 75 and opens contact 76 resulting in discharge of counter capacitor 58 and restoring the grid circuit of tube 70 to a condition where it is ready to receive the next signal.

Potentiometer 59 controls the amount of counter output voltage which may be applied to the grid of tube 60. Since the output voltage of the counter is a function of the distance of the moving object from the moving object detector, potentiometer 59 may be used as a range control. Tube 60 may be either a vacuum tube or a gaseous tube of the thyratron type which remains in a continuous state of conduction once it has been fired by a positive input impulse. Therefore, relay contacts 65 may be made to remain closed and the indicator or alarm 66 will continue to function until the cathode switch 62 is opened. Resistors 61 and 63 provide fixed bias to cut off the tube 60 during the absence of moving object input signals. The timing interval of the single-shot multivibrator may be preset by means of controlling the discharge time constant for capacitor 74 by adjustment of variable resistor 79. It will be apparent to those skilled in the art that other means than those described for the counting of the number of impulses during a finite interval may be employed with equal effectiveness. Electromechanical relays may be employed for this purpose. Thus through the use of counting circuits the moving object detector may be used for the purpose of measuring speed and of determining when a moving object has reached a predetermined speed.

Another feature of my invention is in its inherent ability to signal to a remote point the presence of a moving object without equipment of any kind being added to the moving object detector. By remotely monitoring the radiated signal from the moving object detector with a radio receiver tuned to the radiated frequency, one may determine from the amplitude changes or the frequency changes occurring in the signal received at the remote point whether or not a moving object is present in the radiated field of energy. Thus the one radiated signal performs the dual function of detecting the presence of a moving object and the function of signalling the presence or absence of a moving object to a remote point.

Due to the novel self contained design of my invention, one embodiment weighing less than twenty pounds and having a physical size of approximately 7 x 7 x 12 inches, may be mounted on a vehicle or other carrier and used to signal the approach or recession of the carrier to or from stationary objects or objects which have motion relative to the carrier. Likewise, the moving object detector may employ a directional antenna or transducer for the purpose of determining the direction of the object in motion relative to the carrier. The moving object may thus be employed as a navigational aid or as an anti-collision indicator. It may also be employed to automatically turn on a warning device such as a fog horn in shipboard use whenever collision is imminent.

The radio frequency embodiment of my invention, operating in the range of one meter or less in wavelength, penetrates non-metallic materials such as walls, floors, ceilings and stored materials. Therefore a high degree of sensitivity to the movement of objects is obtained even when these objects are separated from the moving object detector by the aforesaid non-metallic materials.

The acoustic embodiment of my invention is sensitive to changes in the acoustic impedance of the propagation medium, namely air. However, with suitable design of the amplifier and electrical filter circuits, normal changes in the acoustic impedance due to temperature and humidity will not cause the operation of the alarm or indicator circuits. However, when a rapid change in the acoustic impedance occurs, the circuits will respond. Therefore, the moving object detector will function simultaneously as a moving object detector and a fire detector.

A further feature of my invention is its ability to function as a device for the rapid determination of the location of the equal energy level contours of a radiating transducer or antenna in a free field. To determine the radiation contours of an experimental antenna, for example, it is only necessary to connect the experimental antenna to the moving object detector, and adjust the range control to various ranges or distance. Since adjustment of the range control in no way affects the radiated pattern but only the detection sensitivity to a moving object, the moving object, such as a person, may walk into the energy pattern from various directions. As the moving object causes a signal of given amplitude to be detected, the moving object detector will indicate the fact by ringing a bell or other indication means. By repeating this approach at various angles to the antenna, the pattern contour for each level of energy may be established.

I claim:

1. In a sonic detector of moving objects, the combination of *means including* a sonic signal generator *for creating a standing wave pattern having alternate points of maximum and minimum energy disposed in sequence in the path of motion of said objects,* a sonic transducer, and [a] *an amplitude and* phase-change indicator, in which said signal generator is connected to drive said transducer, said transducer being sensitized to receive reflected sonic signals, and in which said *amplitude and* phase-change indicator is coupled to said transducer and matched to detect change of *amplitude and* phase in said reflected sonic signals comparative to said signal generator output *as said objects move sequentially from one said point to another.*

2. In an electro-magnetic system for detecting and measuring the motion of objects, the combination of *means including* a signal generator and radiating device for radiating energy *for creating a standing wave pattern having alternate points of maximum and minimum energy disposed in sequence in the path of motion of said objects,* and *an amplitude and* [a] phase-differential detection system for detecting *variations in* reflected energy *as said objects move between said points,* in which said signal generator is adapted to generate energy in the form of a continuous sinusoidal wave, in which said radiating device is adapted simultaneously to transmit energy and to receive reflected energy from objects, and in which said detection system comprises *an amplitude and* [a] phase difference detector adapted to detect and measure *changes in amplitude and* the angular difference of phase of signals occurring in the said radiating device and the said signal generator as a result of *changes of* reflected energy *due to motion of said objects between said points.*

[3. The combination of claim 2, in which the detection system is adapted to detect the changes occurring in the signal generator or the radiating device resulting from the combination of the transmitted and the received energy.]

4. In a continuous-wave system for the detection of moving objects, the combination of *means including* a continuous wave transmitter *for creating a standing wave pattern having alternate points of maximum and minimum energy disposed in sequence in the path of motion of said objects,* [a] *an amplitude and* phase-modulation detector circuit, and an indicator, in which said transmitter includes a radiating system shared by said [phase-modulation] detector circuit, in which said [phase-modulation] detector circuit is responsive to said transmitted signals and to signals returned from objects stationary relative to said system, and in which said indicator is coupled to said [phase-modulation] detector circuit to indicate only the condition of *amplitude and* phase change of said return signals said detector comprising means responsive only to the combined vector sum of the transmitted continuous wave and the wave of any signal returned which has a changing *amplitude and* phase relative to the phase of said transmitted wave *as the reflected energy in said pattern changes due to shift of position of said objects sequentially between said points.*

5. In a system for the detection of moving objects, the combination of *means including* an electro-magnetic transmitter having a sinusoidal output *for creating a standing wave pattern having alternate points of maximum and minimum energy disposed in sequence in the path of motion of said objects,* a receiver, and an antenna coupled to said transmitter and said receiver, said receiver being adapted simultaneously and continuously to detect change *in amplitude and* in the vector sum of the transmitted and received signals imposed on said antenna *as the reflected energy in said pattern changes due to shift of position of said objects sequentially between said points.*

6. The combination of claim 5, in which said antenna is an acoustical transducer.

7. In a system for the detection of moving objects, the combination of *means including* a signal source, [a] *an amplitude* phase-difference metering device, and radiation means for transmitting standing wave energy *in the form of a pattern having alternate points of maximum and minimum energy arrayed in sequence in the path of said objects,* said signal source being connected to said radiation means, and said *amplitude and* phase-difference metering device being coupled therebetween and comprising a frequency meter within the sonic frequency range adapted to detect *amplitude and* phase differences of said standing wave energy due to *change of* reflected signals from *all* [moving] objects in the area *as said moving objects move sequentially from one said point to another.*

8. The combination of claim 5, in which said receiver is adapted to detect changes in the electrical wave pattern of said return signals by combining the current and voltage vectors of said generator output and of said return signals.

9. In a detector of moving objects, the combination of a continuous-wave signal generator, an antenna circuit including a coupling, a rectifier, an impedance network, and an indicator, in which said signal generator is connected to said antenna thru said coupling, in which said rectifier is connected likewise to said coupling to receive signals from said antenna circuit and to transmit signals to said impedance network, and in which said impedance network comprises a resistance, a first capacitance and a second capacitance all connected to the output of said rectifier, said resistance and first capacitance being in parallel with each other and in series with said rectifier across said coupling and said signal generator, and said second capacitance being connected in series with said indicator and with said rectifier across said coupling and said signal generator.

10. The combination of claim 9 in which a relay adapted to actuate an alarm is in parallel with said indicator.

11. In a detector of moving objects, the combination of a continuous-wave signal generator including first and second output terminals, an antenna, a rectifier having an input and an output, an impedance network comprising first and second capacitors and at least one resistance, and an indicator, said signal generator being coupled to said antenna and to the input of said rectifier through said first output terminal, said resistance and first capacitance being coupled in parallel between the output of said rectifier and said second output terminal of said signal generator, and said second capacitance being coupled in series with said indicator between the output of said rectifier and said second output terminal.

12. In a detector of moving objects, the combination of a continuous-wave signal generator, a first coupling, an antenna, a second coupling, a loading circuit comprising a rectifier in series with a reactance, and a detection circuit comprising a capacitance and an indicator, in which said signal generator is connected to said antenna through said first coupling, in which said loading circuit is connected to said first coupling through said second coupling, and in which said detection circuit is connected to said rectifier in parallel with said reactance, whereby all continuous signals are absorbed in said loading circuit and whereby all changing signals are imposed on said detection circuit.

13. The combination of claim 12 in which said detection circuit includes a battery substituted for said second capacitance in series with said indicator.

14. The combination of claim 12 in which the frequency of said continuous wave signal generator is dependent upon impedance change in said antenna.

15. The combination of claim 12 in which said detection circuit includes an alarm system, a synchronizer, and a counter of received signals, whereby a succession of detected oscillations or bi-polar changes must occur within a predetermined interval of time to trigger said alarm system.

16. The combination of claim 5 in which said receiver includes means for counting rotations of the vector representing said received signals relative to the vector of said transmitted signal, whereby the velocity of objects relative to said transmitter and receiver may be measured from any given velocity down to zero velocity.

17. The combination of claim 5 in which said receiver includes means for measuring the magnitude of said vector sum of the transmitted and received signals, whereby the relative distance of a given object may be measured.

18. The combination of claim 11 in which said first and second terminals are adapted to accommodate interchangeable electromagnetic and acoustical signal generators and radiation means.

19. The combination of claim 12 in which said reactance comprises a load capacitor in parallel with a resistance.

20. The combination of claim 12 in which said detection circuit includes a removed alarm system triggered by wireless means.

21. The combination of claim 14, including a remote detector resonant to the transmitted signals and adapted to trigger an alarm when said signals change.

22. The combination of claim 12 in which said indicator is calibrated to record continuously the motion of objects from the farthest distance of detection down to zero distance.

23. The combination of claim 12 in which said indicator comprises a chemical recorder.

24. The combination of claim 12 in which said indicator comprises mechanical recording device showing signal strength continuously on a time base.

25. In an acoustical system for detecting and measuring the motion of objects, the combination of a continuous-wave sonic generator and transducer for radiating sonic energy, and a detection system for detecting reflected energy, in which said transducer is adapted simultaneously to transmit energy and to receive reflected energy from objects, and in which said detection system is adapted to detect and measure signals occurring in said transducer and said sonic generator resulting from reflected energy said detector comprising a metering device resonant to the phase and frequency of said transmitted energy and non-resonant with respect to the phase and frequency of any other signal.

26. In an object detection system, the combination of a continuous-wave signal generator, radiation means including a coupling, an impedance network, a rectifier, a detector load circuit, and an indicator circuit, in which said signal generator is connected to said radiation means through said coupling, in which said impedance network is coupled to said coupling and is resonant to the frequency of said signal generator, in which said rectifier is connected to said impedance network and to said detector load circuit and said indicator circuit, in which said detector load circuit includes a first reactor, and in which said indicator circuit includes a second reactor and a meter, said detector load circuit and indicator circuit being connected in series with said rectifier across said impedance network, whereby said indicator circuit is responsive only to changes in loading of said radiation means.

27. The combination of claim 25, in which the frequency of said continuous wave signal generator is dependent upon impedance change in said radiation means.

28. In an object detection system, the combination of a continuous-wave signal generator, antenna means including a coupling, an impedance network, a rectifier, and a detector circuit, in which said signal generator generates signals of fixed phase and frequency and is connected to said antenna means through said coupling, in which said impedance network includes a reactance connected between said coupling and said rectifier, and in which said detector circuit includes at least one capacitance and current indicator means, said detector being connected in series with said rectifier and said impedance across said signal generator, whereby said reactance is adapted to be non-resonant to said generated signals of said signal generator and responsive to change in said signals.

29. The combination of claim 28, in which said impedance network includes at least one inductance.

30. In an object detection system, the combination of *means including* a continuous-wave signal generator including feedback means *for creating a standing wave pattern having alternate points of maximum and minimum energy disposed in sequence in the path of motion of said objects,* antenna means including a coupling, a rectifier, and a detector circuit, including a capacitor and indicator, in which said signal generator is connected to said antenna means through said coupling, in which said rectifier is connected to said coupling and to said feedback means, and in which said detector circuit is connected in series with said rectifier across said signal generator, whereby said detector circuit responds only when change occurs in the *amplitude* phase and frequency of signals at said coupling *as said objects move sequentially between said points.*

*31. Apparatus for detecting motion of objects of a given size and given characteristic motion comprising means for creating a standing wave pattern of radiated energy having equipotential points separated by a distance roughly comparable to the physical size of the said object and alternate points of maximum and minimum radiated energy disposed in sequence in the path of motion of said object, means for detecting changes in said standing wave pattern above a minimum threshold of amplitude when said changes occur at a frequency of fluctuation corresponding substantially to the rate at which said object sequentially passes said equipotential points when moving in accordance with said characteristic motion, and alarm means actuated by said detecting means for indicating the presence of said object so moving.*

*32. The apparatus defined in claim 31 further characterized by the inclusion of means for preventing false alarms comprising means for counting said changes, timing means operatively associated with said counting means, and means for actuating said alarm means only when a given number of said changes are counted by said counter within a given interval of time established by said timing means.*

References Cited in the file of this patent or the original patent

UNITED STATES PATENTS

| | | |
|---|---|---|
| 2,238,041 | Dickens | Apr. 15, 1941 |
| 2,333,688 | Shepard | Nov. 9, 1943 |
| 2,617,983 | Emslie | Nov. 11, 1952 |
| 2,622,140 | Müller et al. | Dec. 16, 1952 |
| 2,659,077 | Emslie | Nov. 10, 1953 |
| 2,677,126 | Webb | Apr. 27, 1954 |

FOREIGN PATENTS

| | | |
|---|---|---|
| 585,988 | Great Britain | Mar. 4, 1947 |